(No Model.) 2 Sheets—Sheet 1.

B. BIDWELL.
INSULATION OF CORES OF DYNAMO ELECTRIC MACHINES.

No. 392,660. Patented Nov. 13, 1888.

Witnesses,
L. F. Mann,
Martin Olsen.

Inventor,
Benson Bidwell.

(No Model.) 2 Sheets—Sheet 2.

B. BIDWELL.
INSULATION OF CORES OF DYNAMO ELECTRIC MACHINES.

No. 392,660. Patented Nov. 13, 1888.

Witnesses
L. F. Mann,
Martin Olsen

Inventor,
Benson Bidwell

United States Patent Office.

BENSON BIDWELL, OF CHICAGO, ILLINOIS.

INSULATION OF CORES OF DYNAMO-ELECTRIC MACHINES.

SPECIFICATION forming part of Letters Patent No. 392,660, dated November 13, 1888.

Application filed October 17, 1887. Serial No. 252,632. (No model.)

*To all whom it may concern:*

Be it known that I, BENSON BIDWELL, a citizen of the United States, residing at Chicago, in the county of Cook and State of Illinois, have invented certain new and useful Improvements in Dynamo-Electric Machines and Motors, of which the following a full, clear, and concise description, sufficient to enable others skilled in the art to which it appertains to make and use the same.

My invention relates particularly to the insulation of the iron core from the wire coils surrounding the same in dynamo-electric machines and motors, and has for its object a more perfect insulation than has been heretofore obtained by the use of ebonite, paper, wood, cloth, &c., which are deleteriously affected by heat and moisture.

My invention consists of sheets, spools, or tubes of thin metal shaped to fit the cores and parts of dynamo-electric machines and motors, and covered with substances which vitrify under the action of a proper degree of heat and form an enamel or glaze over their surface, so that the conducting-wires may be wound thereon without further preparation or insulation.

The invention further consists of building up the cores of armatures and field-magnets of dynamo-electric machines and motors with thin iron sheets which are perforated so that the holes correspond with one another, in which are inserted tubes of porcelain, glass, or other vitreous material to insulate and protect the conducting-wires which are drawn through said tubes.

The invention also consists of thin metal tubes covered with porcelain, glass, or other vitreous material and inserted in the perforations of said armature and field-magnet cores for the protection and insulation of the conducting-wires drawn therein.

In the accompanying drawings, Figure 1 is a side elevation, partly in section, of a dynamo-electric machine or motor insulated in accordance with the design of my invention. Fig. 2 shows one of my dynamo-electric machines in its completed form, ready for operation. Figs. 3 and 4 show modifications of a field-magnet core. Fig. 5 is a cross-section of the plate shown in Fig. 3, showing the insulating tubes and conductors therein. Fig. 6 is a section of a disk of an armature-core, showing the insulating-tubes inserted in its perforations. Fig. 7 is a portion in section of the plate shown in Fig. 3. Fig. 8 is an insulating-spool, made of porcelain, glass, &c. Fig. 9 is one of the disks of which the armature is built up.

In Fig. 1, A represents a portion of a field-magnet; B, the iron core of same; A' A', the enameled or glazed metallic sheets thereon; C C, the conducting-wires; $A^2$, the armature-core; d, the tubes of porcelain or metal covered with porcelain, inserted in the perforations in the armature-core; B', the conducting-wires down through the insulating-tubes.

In Fig. 2, A' A' show portions of the porcelain insulating-spools; $A^2$, the armature; B', the armature-conductors; d, the insulating-tubes of porcelain, glass, or metal covered with vitreous insulation; E H, the brushes bearing on the commutator S; F F' $F^2$ $F^3$, the field-magnet coils; G, the terminals connected to the field-magnet coils F' $F^2$; c c, wires connecting the brushes with the coils F $F^3$ of the field-magnets.

In Fig. 3, B is a section of a field-magnet core, which is perforated with holes for the insertion of insulating-tubes A'.

In Fig. 4, B is a portion of a field-magnet. A' A' A' A' are portions of porcelain spools or metal spools covered with porcelain. C C are the magnet-wires wound on the porcelain spools; b, a metal spool covered with vitreous insulation A'.

Fig. 5 is an end view of a section of a built-up field-magnet. A' are insulating-tubes inserted in the perforations of the core. K K' are conducting-wires drawn through the tubes A'.

In Fig. 6, $A^2$ is one of the perforated disks of which the armature-core is built upon the shaft S. A' A' are insulating-tubes of porcelain or porcelain-covered metal inserted in the perforations of the armature-core $A^2$.

Figure 1:
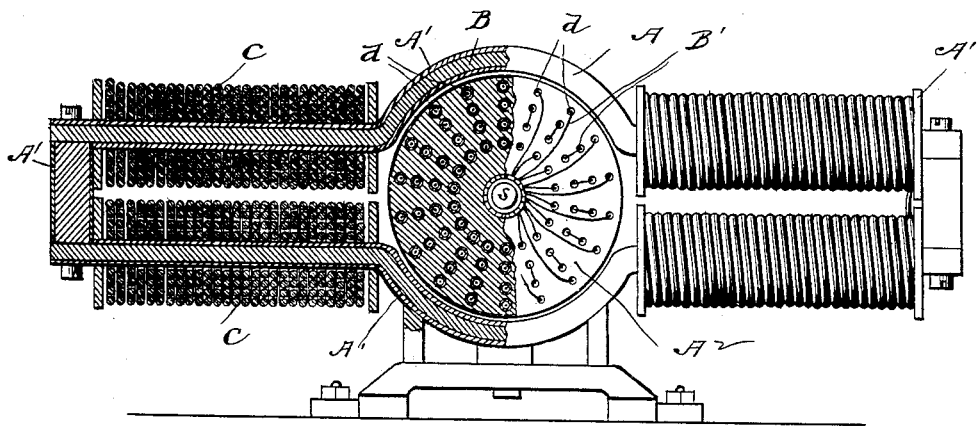
Figure 2:
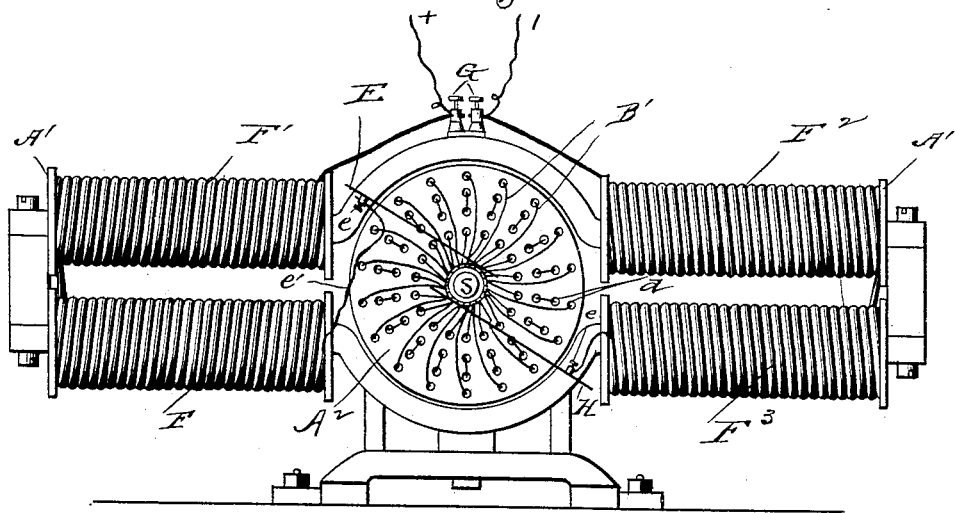
Figure 8:
Fig. 8 is a porcelain or glass spool on which the conducting-wires are wound and placed on the core of a field-magnet.
Figure 3:
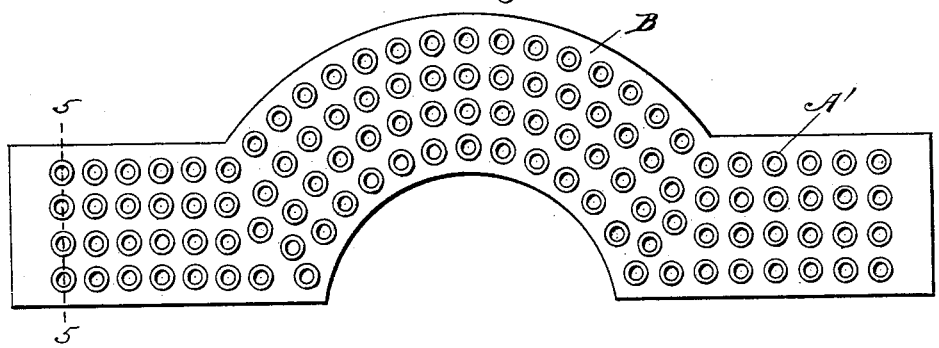
Figure 4:
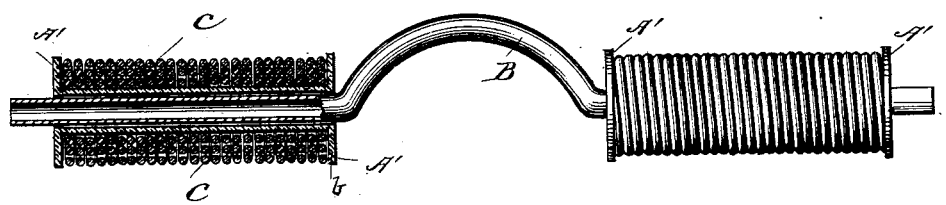
Figure 5:
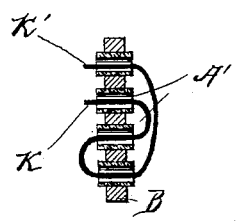
Figure 6:
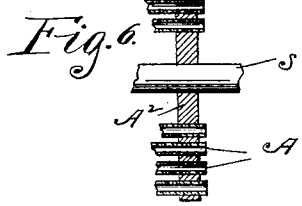
Figure 7:
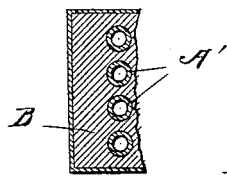
Fig. 7 is a portion of a section of a built-up field-magnet core, showing insulating-tubes A' of porcelain, glass, or metal covered with vitrifiable material.
Figure 9:
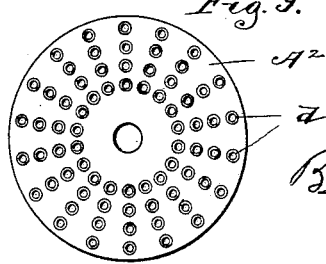
Fig. 9 shows a disk of which the armature-core is built up, and shows tubes $d$ in the perforations of the disk $A^2$.

In the drawings I have shown field-magnet and armature-cores built up with perforated sections having tubes of porcelain or porcelain-covered metal in said perforations for the insertion of the conducting-wires; but I do not herein claim the same, as they form the subject-matter of a separate application.

Having thus described my invention and its operation, what I claim as new, and desire to secure by Letters Patent, is—

1. In a dynamo-electric machine or motor, a field-magnet core covered with sheets or spools of thin metal, said metallic sheets or spools being covered with porcelain, glass, or other vitreous material, substantially as shown and described.

2. In a dynamo-electric machine or motor, an armature-core covered with sheets of thin metal, said metal sheets being covered with porcelain, glass, or other vitreous material, substantially as shown and described.

In witness whereof I have hereunto signed my name in the presence of two subscribing witnesses.

BENSON BIDWELL.

Witnesses:
CHAS. B. ASKEW,
L. T. MANN.